UNITED STATES PATENT OFFICE.

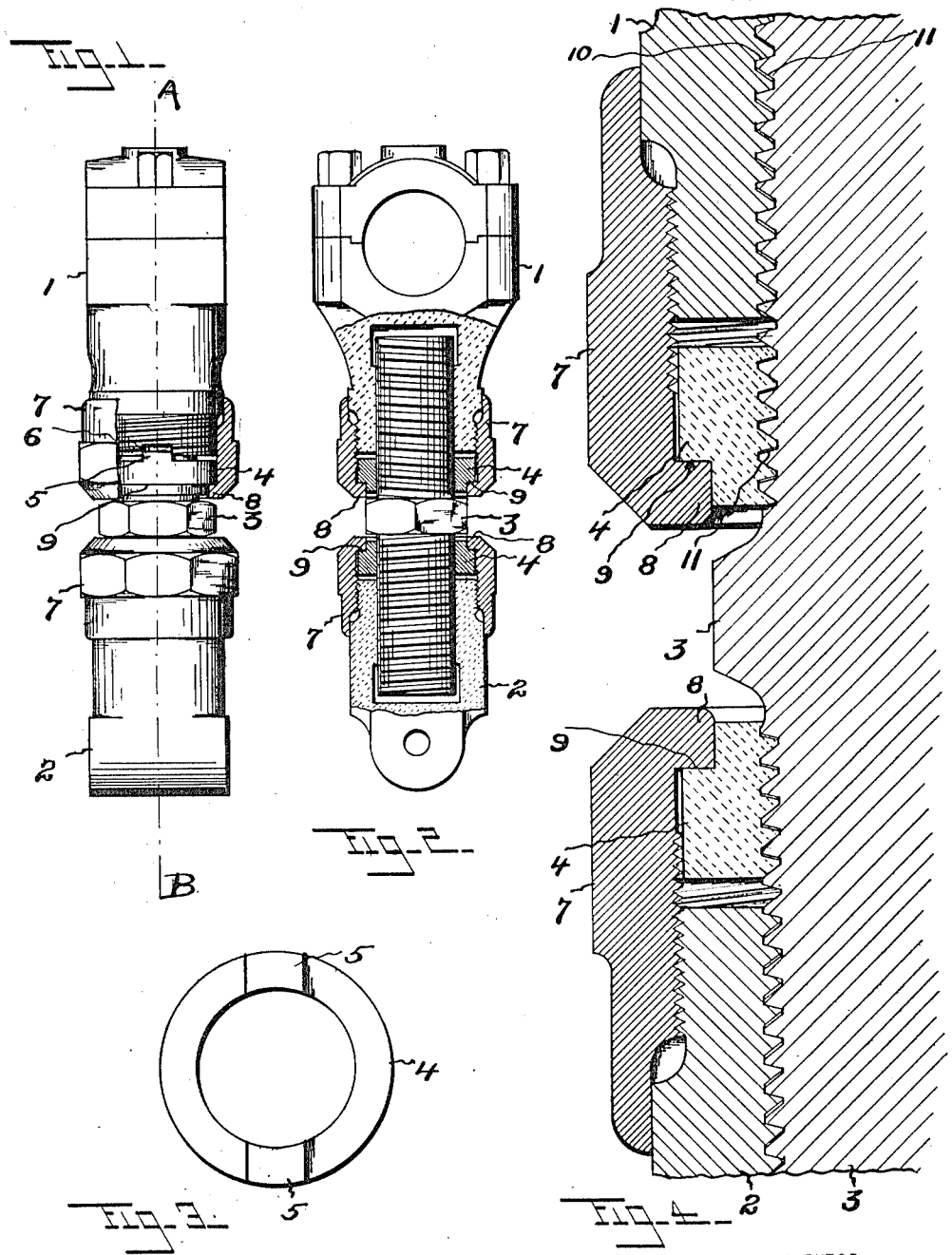

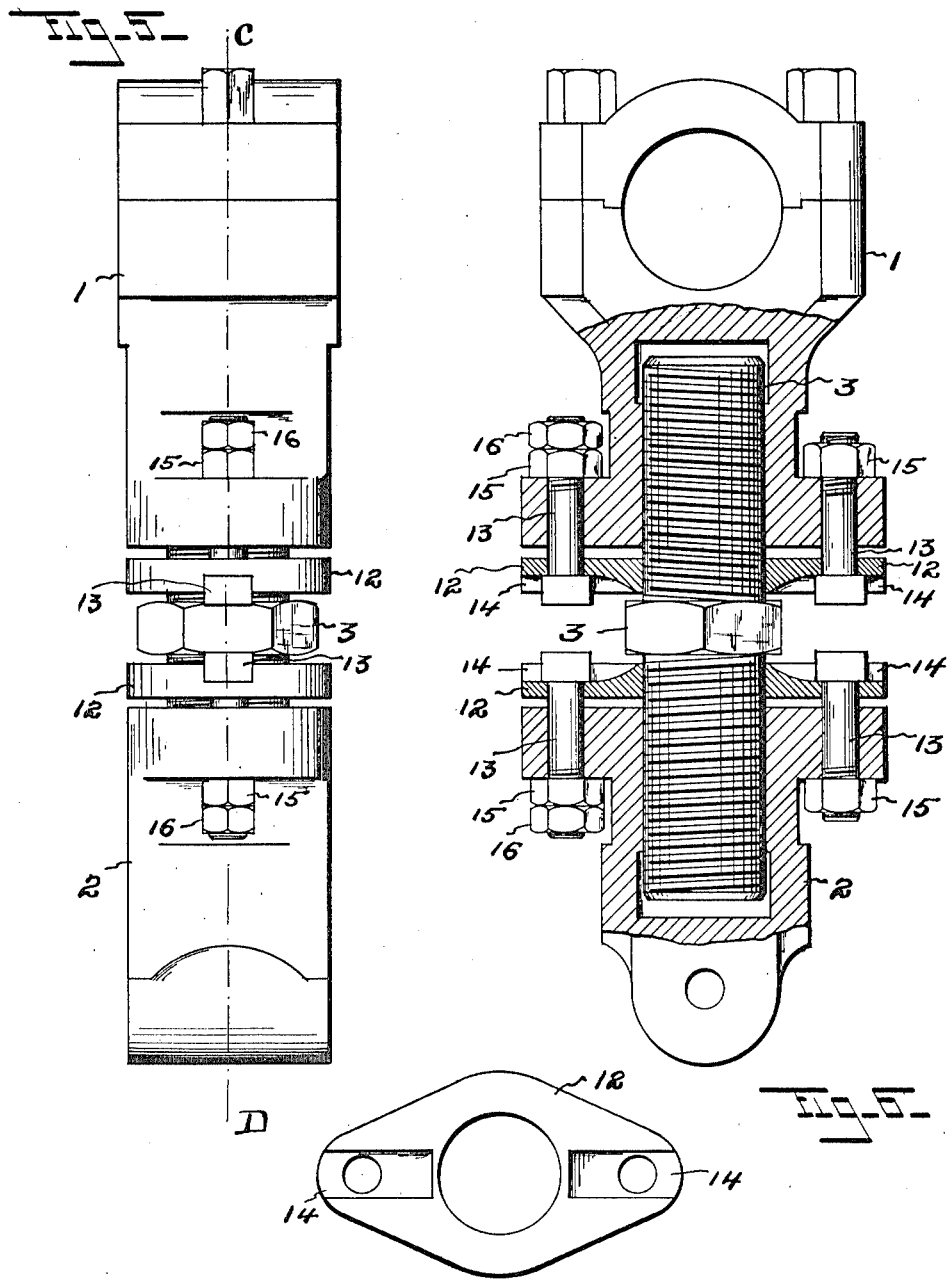

ZENAS P. CANDEE, OF WATERBURY, CONNECTICUT, ASSIGNOR TO WATERBURY FARREL FOUNDRY AND MACHINE COMPANY, OF WATERBURY, CONNECTICUT, A CORPORATION OF CONNECTICUT.

CONNECTION.

1,072,425.  Specification of Letters Patent. Patented Sept. 9, 1913.

Application filed May 18, 1912. Serial No. 698,136.

*To all whom it may concern:*

Be it known that I, ZENAS P. CANDEE, a citizen of the United States, residing at Waterbury, in the county of New Haven and State of Connecticut, have invented certain new and useful Improvements in Connections, of which the following is a specification, reference being had therein to the accompanying drawings.

My invention relates to a new and improved connection, referring more particularly to that type of connection used in a press or similar device for joining the crank shaft with the gate.

It is the object of my invention, among other things, to provide means whereby the adjusting screw therein may be held against endwise movement while the gate is in operation, thereby preventing wear upon the parts and accumulation of back play by the screw within its threaded socket; a further object being to so design such means that it will have engagement with the screw at more than one point about its periphery.

To these, and other ends, my invention consists in the connection, having certain details of construction and combinations of parts, as will be hereinafter described and more particularly pointed out in the claims.

Referring to the drawings, in which like numerals of reference designate like parts in the several figures; Figure 1 is a view of my improved connection partly in section; Fig. 2 is a view looking toward the right of Fig. 1, some of the parts thereof being in section upon line A—B of Fig. 1; Fig. 3 is a view of the lock nut; Fig. 4 is an enlarged view of a portion of the adjusting screw with the clamp and lock nuts; Fig. 5 is a view of a modified form of my invention; Fig. 6 is another view of the modified form looking toward the right of Fig. 1 with some of the parts in section upon line C—D of Fig. 5; and Fig. 7 is a view of the lock plate.

The connection herein shown and described is of the type generally used upon a power press, one member being connected with the crank shaft, and another member with the gate. The relative positions of the gate with the crank shaft being adjustable through a screw that is threaded in each of said members, in one with a right hand thread and in the other with a left hand thread, so that by rotation of the screw in one direction the members are drawn toward each other, and vice versa.

In operating the press, substantially all of the strain is upon the screw threads, hence it is necessary that the male and female threads be fitted with great exactness and nicety. This is not always accomplished, however, in practice, as frequently there is a slight endwise movement of the screw within the connection mechanism, which increases materially as the press is used. Even though the screw is properly fitted originally, in time it works loose and considerable back play develops. To eliminate this objection in the present type of connection, is largely the object of my invention, and I accomplish it through the medium of a nut or plate threaded on the screw that holds said screw so that the thread surfaces taking the thrust or strain are held tightly against each other.

In the drawings, in which the connection is illustrated in only one of the many forms in which it may be made, the numeral 1 designates the member that is secured to the crank, and 2 the member that is connected with the gate, both being joined through a screw 3, threaded into one of the members with a right hand thread and the other with a left hand thread. Upon said screw are the lock nuts 4, which are shown herein as being circular in form and having the lips 5 on one face thereof, which enter radial recesses 6 in the inner ends of the members 1 and 2. Threaded onto the inner end of each of said members is a clamp nut 7, having a lip 8 thereon that engages the shoulder 9 upon the lock nut 4. The screw 3 during its rotation moves through the lock nuts 4, that are held against rotation by the engagement of the lips 5 with the recesses 6. After the members 1 and 2 have been moved to their proper relative position, the clamp nuts are successively rotated and the lock nut is moved toward the member with which it is connected, this movement of the lock nut resulting in the movement of the screw so that the faces of the thread that take the strain are held tightly against each other and have no opportunity to move therefrom.

In Fig. 4 I have illustrated the relative position of all of the parts when the lock nuts are secured in position, wherein it will be observed that the faces 10 on the thread in the member 1 and screw 3 that take the thrust or strain are in close contact with each other, while the open space or play, if any, lies between the faces 11 upon the other side of the thread, where there is practically no strain. As the lock nut 4 moves the screw 3 into the member 1, the thrust or strain upon the thread in the lock nut is upon the faces 11 and not upon the faces 10, in which case the open space, if any, is reversed. The same situation applies to the member 2, except that the conditions are reversed, the entire thrust or strain between the members 1 and 2, when in operation, being a compression strain, hence the work would come upon the opposite side of the thread.

If by reason of wear, or for other reasons, the threads become worn, an additional slight rotation of the clamp nut 7 will take up this wear and eliminate all back lash or play.

In Figs. 1 to 4 inclusive the preferred form of my invention is illustrated, but as the details of its construction may be varied indefinitely, I have taken the liberty in Figs. 5, 6 and 7 of showing one of such modified forms, wherein a lock plate 12 is substituted for the lock nut 4 and clamp nut 7, this lock plate being threaded upon the screw 3 in the same manner as the lock nut 4, and moved toward the member to which it is attached by means of the bolts 13, the heads of which lie in grooves 14 to prevent their rotation, and having nuts 15 threaded upon the ends thereof, with at least one of said bolts provided with a lock nut 16.

The operation of this modified form of device is exactly the same as that of the preferred form, the lock plate, however, being moved through manipulation of the nuts 15 and 16 instead of through the clamp nut 7.

There are minor changes and alterations that can be made within my invention, aside from those herein suggested, and I would therefore have it understood that I do not limit myself to the exact construction herein shown and described, but claim all that falls fairly within the spirit and scope of my invention.

Having described my invention, what I claim as new and desire to secure by Letters Patent, is:—

1. In a device of the character described, the combination with two independent members; of a threaded member threaded into each of and connecting said independent members; means connected with each of said independent members and having engagement with said threaded member upon opposite sides thereof, for holding said threaded member so that the side of the threads thereon that take the thrust and strain may be held tightly against the corresponding side of the threads in said independent members, said means comprising locking members threaded onto said threaded member and held against rotation with respect to one of said independent members with an open space between each locking member and the end of said independent member with which it is connected; and means connected with each of said independent members and said locking members for moving said locking members toward said independent members and said threaded member within its threaded sockets in said independent members parallel with its axis and without rotation, a sufficient distance to take up the play or lost motion within the threads.

2. In a device of the character described, the combination with two independent members; of a threaded member connecting said having engagement with said threaded member connected with the inner end of each of said independent members with an an open space therebetween and held against rotation in relation thereto; and means connected with said locking members and independent members for moving the said locking members toward the said independent members and the threaded member within the said independent members, parallel with its axis but without rotation, a sufficient distance to take up the play or lost motion within the threads.

3. In a device of the character described, the combination with two independent members; of a threaded member connecting said independent members; locking members threaded onto said threaded member, each locking member having a lip and recess connection with the inner end of each of said independent members, and an open space therebetween; and a sleeve member threaded onto the inner end of each of said independent members and engaging one of said locking members so as to move the same parallel to the axis of said threaded member but without rotation, a sufficient distance to take up the play or lost motion within the threads.

In testimony whereof I affix my signature in presence of two witnesses.

ZENAS P. CANDEE.

Witnesses:
ROGER S. WOTKYNS,
GEO. A. GAUTHIER.